3,038,014
UNSATURATED HALOGEN-CONTAINING ORGANIC DISULFIDES

Emil J. Geering, Grand Island, N.Y., assignor to Hooker Chemical Corporation, Niagara Falls, N.Y., a corporation of New York
No Drawing. Filed Feb. 8, 1960, Ser. No. 7,070
4 Claims. (Cl. 260—608)

This invention relates to a new composition of matter, its method of manufacture, and its use. More specifically the inventive concept of this invention resides in the compounds bis(trihalovinyl) disulfide.

In co-opending application S.N. 800,933 filed in the United States Patent Office March 23, 1959, the preparation of new composition of matter bis(tetrachloroethyl) disulfide is disclosed. By dehydrohalogenating bis(tetrachloroethyl) disulfide, the composition of this invention may be prepared. Similarly, dehydrohalogenation of bis(tetrahaloethyl) disulfides containing halogens other than chlorine gives the corresponding perhalovinyl disulfides.

Bis(trichlorovinyl) disulfide can be prepared by heating bis(tetrachloroethyl) disulfide in the presence of a Lewis acid such as ferric chloride or aluminum chloride. It is difficult to prepare a product of high purity and in good yield by this method, however, because of the instability of bis(trichlorovinyl) disulfide in the presence of these catalysts. The preferred method is to effect the dehydrochlorination of bis(tetrachloroethyl) disulfide by the action of a suitable base. Numerous bases can be used to dehydrochlorinate bis(tetrachloroethyl) disulfide. The choice of dehydrochlorination agent is critical if satisfactory yields are to be obtained as most bases react with the product as well as the starting material. Thus, bis(trichlorovinyl) disulfide reacts with alkali and alkaline earth hydroxides and carbonates, alkoxides, phenoxides, mercaptides, amines, etc., and a variety of useful products can be obtained from these reactions. Some of these reactions are slow, however, and in these instances the bases can be used as dehydrohalogenation agents. This disclosure of the reactivity of bis(trichlorovinyl) disulfide illustrates its usefulness as a chemical intermediate and also demonstrates the importance of choosing a suitable base for its preparation. A suitable base will react at a practical rate with bis(tetrachloroethyl) disulfide but will react only slowly with bis(trichlorovinyl) disulfide. Examples of such bases include sodium acetate, sodium carbonate and triethanol amine. Other bases will suggest themselves to one skilled in the art.

If desired, the dehydrochlorination of bis(tetrachloroethyl) disulfide and the reaction of bis(trichlorovinyl) disulfide with a base can be conducted without isolating bis(trichlorovinyl) disulfide.

The compound of this invention is useful as a contact herbicide, as a resin intermediate, and as a chemical intermediate.

The following examples illustrate preparations of and utility for the composition of this invention, and the wide variety of bases that can be used as dehydrochlorination agents for bis(tetrachloroethyl) disulfide.

Example I

To prepare a sample of bis(trichlorovinyl) disulfide the following procedure was run:

A solution of 100 g. (0.251 moles) of bis(tetrachloroethyl) disulfide and 500 ml. of anhydrous acetone was prepared. To the stirred solution was added 37.5 g. (0.251 moles) of triethanolamine. The reaction mixture was cooled during the addition in order to keep the temperature at 25 degrees centigrade or lower. The precipitated triethanolamine hydrochloride was filtered off and washed with acetone. Additional triethanolamine was added to the combined filtrate and washings as before. After a total of 75 g. (0.502 moles) of triethanolamine had been added, the formation of amine salt ceased. A slight excess of about 5 g. of triethanolamine was then added.

The acetone solution was treated with charcoal and was then heated on the steam bath until most of the acetone had been removed. The residue was composed of two layers. The small upper layer was discarded. The lower layer was treated with charcoal and concentrated under vacuum. The orange residue weight 62 g. (76 percent) yield.

Analysis.—Calc'd. for $C_4Cl_6S_2$: Cl, 65.5; S, 19.7. Found: Cl, 65.3; S, 19.3.

Infrared analysis demonstrated that bis(tetrachloroethyl) disulfide was not present and, in addition, that no C-H groups were present.

Example II.—Preparation of Bis(Trichlorovinyl) Disulfide

A mixture of 206 g. (2.51 moles) of anhydrous sodium acetate, 500 g. (1.26 moles) of bis(tetrachloroethyl) disulfide and one liter of ethanol was stirred at 25–30 degrees centigrade for 19 hours. The mixture was filtered and the filtrate was concentrated at 60°/25 mm. The residue was distilled through a ten-inch Vigreux column and a fraction collected at 132–147°/0.5–0.8 mm. which weighed 330 g. (80.5 percent yield). Infrared comparison of this fraction with an authentic sample demonstrated that the product was >95 percent bis(trichlorovinyl) disulfide.

Example III.—Preparation of Bis(Trichlorovinyl) Disulfide

A slurry of 597 g. (1.5 moles) of bis(tetrachloroethyl) disulfide, 308 g. of sodium carbonate (2.9 moles) and three liters of acetone was stirred at reflux for eight and one-quarter hours. The slurry was cooled and filtered and the filtrate concentrated by distillation of 20 mm. to a pot temperature of 60 degrees centigrade. The residue was filtered to give 425 g. of product (87 percent yield). Infrared comparison of the product with an authentic sample of bis(trichlorovinyl) disulfide demonstrated that the product was >95 percent bis(trichlorovinyl) disulfide.

Example IV.—Synthesis of Trichlorovinylsulfenyl Chloride

To illustrate the use of the compound of this invention as an intermediate the following procedure was run:

To 29 parts of bis(trichlorovinyl) disulfide at −20 degrees centigrade was added 6.3 parts of chlorine. The mixture (35 parts) was allowed to warm slowly to room temperature and then was distilled through a short fractionating column to obtain 27 parts of trichlorovinylsulfenyl chloride, a red malodorous liquid boiling at 39–45 degrees centigrade (0.3–0.5 mm.). The infrared spectrum showed the presence of a double bond at 6.55$\mu$. The presence of the sulfenyl function was proved by the release of iodine from potassium iodide solution immediately upon admixture of the product.

Analysis.—Calc'd. for $C_2Cl_4S$: Cl, 71.8; S, 16.2. Found: Cl. 72.0; S, 15.7.

The trichlorovinylsulfenyl chloride made by this example has valuable utility as a pesticidal fumigant.

The compound of the invention is effective as a contact herbicide. As such, it may be employed in the pure form, or emulsified with water by use of an emulsifier or dissolved in a solvent such as kerosene, diesel oil, fuel oil, or the like.

Example V

The compound of the invention was sprayed at the rate of eight pounds per acre on a vigorously growing stand for pigweed, lambsquarter, chickweed, yellow rocket, barnyard grass, and dock. Within a day, these weeds became severely wilted and, after several days, death of the sprayed foliage resulted.

The compound of the invention also possesses utility as a resin intermediate. It reacts, for example, with difunctional nucleophilic reagents such as diamines to yield polycondensation products.

*Example VI*

A five percent solution of the bis(trichlorovinyl)disulfide in hexane was agitated with a six percent solution of hexamethylene diamine in three percent aqueous caustic soda. Within a few seconds, a thick rubbery mass of a tan resin separated. After decantation of the liquid phase, the solids were washed with water to yield a tan resin containing sulfur, nitrogen, and chlorine, and having a marked degree of elasticity. This resin was self-extinguishing when ignited with a flame.

*Example VII.—Dehydrochlorination of Bis(Tetrachloroethyl)Disulfide Using Various Bases*

A solution of 58.9 g. (1.05 moles) of potassium hydroxide and 300 ml. of ethanol was added to a stirred solution of 199 g. (0.5 mole) of bis(tetrachloroethyl)disulfide and 300 ml. of ethanol. The temperature of the reaction mixture was maintained at 25 degrees centigrade by cooling during the addition. The mixture was then filtered and the filtrate concentrated at 30 degrees centigrade and 25 mm. to a residue of 129 g. The residue contained 70 percent of bis(trichlorovinyl)disulfide as shown by infrared comparison with an authentic sample.

*Example VIII*

Bis(tetrachloroethyl)disulfide, 100 g. (0.251 mole) was slowly added to a vigorously stirred slurry of 37.3 g. of calcium hydroxide (0.503 mole) which was heated to 80 degrees centigrade. During the addition, the reaction became vigorously exothermic and cooling was necessary. Upon completion of the addition, the reaction mixture was extracted with chloroform. The residue remaining on concentrating the chloroform extract contained 70 percent bis(trichlorovinyl)disulfide as demonstrated by infrared comparison with an authentic sample.

*Example IX*

A 29 percent aqueous ammonium hydroxide solution, 56.8 ml. (0.423 mole) was added during fifteen minutes to a stirred solution of 110 g. (0.277 mole) of bis(tetrachloroethyl)disulfide and 750 ml. of ethanol held at 10 degrees centigrade. The mixture was filtered and water was added to the filtrate. The separated product contained 87 percent bis(trichlorovinyl)disulfide as demonstrated by infrared comparison with an authentic sample.

*Example X*

Diisobutyl amine, 40 g. (0.31 mole), was slowly added to a solution of 80 g. (0.2 mole) of bis(tetrachloroethyl)disulfide in 600 ml. of ethyl ether. The mixture was filtered to remove amine salt and the filtrate concentrated to a residue containing additional amine hydrochloride. The residue was filtered, the filtrate was taken up in ether and the ether solution washed with dilute hydrochloric acid. The ether solution was dried and concentrated to an oil which contained 49 percent of bis(trichlorovinyl)disulfide as demonstrated by infrared comparison with an authentic sample.

*Example XI*

A slurry of bis(tetrachloroethyl)disulfide, a strongly basic ion exchange resin (Permutit S–1) and methanol was stirred at room temperature for 15 hours. The product was separated and was shown by infrared comparison with an authentic sample to contain 33 percent of bis(trichlorovinyl)disulfide.

*Example XII*

A slurry of 100 g. (0.25 mole) of bis(tetrachloroethyl)disulfide, 42 g. (0.5 mole) of sodium bicarbonate and one liter of acetone was stirred at reflux for 39 hours. The slurry was then filtered and the product separated by adding water to the filtrate. The product contained 95 percent bis(trichlorovinyl)disulfide as shown by infrared comparison with an authentic sample.

Included within the scope of this invention are all the halogenated disulfides of this group; preferred however are chlorine and bromine.

The examples of the composition of our invention, and methods of preparing and utilizing them which have been described in the foregoing specification, have been given for purpose of illustration, not limitation. Many other modifications and ramifications will naturally suggest themselves to those skilled in the art, based on the disclosure of our basic discovery. These are intended to be comprehended within the scope of our invention.

I claim:
1. Bis(trihalovinyl)disulfide wherein the halogen is selected from the group consisting of chlorine and bromine.
2. Bis(trichlorovinyl)disulfide.
3. A method for the preparation of bis(trichlorovinyl)disulfide which comprises treating bis(tetrachloroethyl)disulfide with a Lewis acid.
4. A method for the preparation of bis(trichlorovinyl)disulfide which comprises treating bis(tetrachloroethyl)disulfide with a base.

References Cited in the file of this patent
UNITED STATES PATENTS

| | | |
|---|---|---|
| 2,396,788 | Hoffman | Mar. 19, 1946 |
| 2,796,437 | Park | June 8, 1957 |